United States Patent

Endres et al.

[11] Patent Number: 4,489,118
[45] Date of Patent: Dec. 18, 1984

[54] SOFT MOISTURE RESISTANT TISSUE PRODUCT

[75] Inventors: Dan D. Endres; Attila Matray, both of Outagamie County, Wis.

[73] Assignee: Kimberly-Clark Corporation, Neenah, Wis.

[21] Appl. No.: 471,574

[22] Filed: Mar. 3, 1983

[51] Int. Cl.³ .......................... B32B 27/10; B32B 3/02
[52] U.S. Cl. .................................... 428/154; 428/192; 428/194; 428/211; 428/332; 428/511
[58] Field of Search ............... 428/154, 192, 195, 194, 428/211, 332, 511

[56] References Cited

U.S. PATENT DOCUMENTS

| 1,865,459 | 7/1932 | Edmands | 428/154 |
| 2,897,108 | 7/1959 | Harwood | 428/152 |
| 3,925,127 | 12/1975 | Yoshioka | 428/154 |
| 4,178,407 | 12/1979 | Rubens | 428/284 |

FOREIGN PATENT DOCUMENTS 1061054  3/1967  United Kingdom .
1242572  8/1971  United Kingdom .

Primary Examiner—Paul J. Thibodeau
Attorney, Agent, or Firm—Gregory E. Croft

[57] ABSTRACT

A multi-layered absorbent tissue having a plastic inner layer is prepared by substantially overall bonding the plastic layer to no more than one of two adjacent layers.

12 Claims, 3 Drawing Figures

SOFT MOISTURE RESISTANT TISSUE PRODUCT

BACKGROUND OF THE INVENTION

1. Field of the Invention

This invention relates to multi-layered tissues and, more particularly, to multi-layered tissues containing plastic film inner layers.

2. Description of Prior Art

It is well known in the papermaking arts that laminates of plastic film and cellulosic webs can be produced to impart moisture impermeability to otherwise absorbent webs. For example, U.S. Pat. No. 2,897,108 (1959) to Harwood teaches a disposable absorbent pad or handkerchief consisting of two outer absorbent tissue sheets whose fibers are embedded in an inner plastic film. The composite product is made by sandwiching the plastic film between the tissue sheets and temporarily softening the plastic, as by heating, to bond the two outer sheets to the inner plastic film to form a laminate.

U.S. Pat. No. 4,178,407 (1979) to Rubens teaches a paper towel having a sheet of plastic which has been uniformly coated with adhesive and sandwiched between two layers of tissue paper.

British Pat. No. 1,061,054 (1967) teaches a laminated sheet material wherein a thin film of thermoplastic, such as polyethylene, is extruded into a nip between two creped wadding sheets to laminate both sheets to the thermoplastic film. The primary use of such laminates is for surgical sheets.

British Pat. No. 1,242,572 (1971) teaches a laminated material having an inner layer of a web of fibers impregnated with a thermoplastic binder sandwiched between and bonded to two outer layers of soft paper tissue. The product is primarily used as garments or covers for hospital use.

However, all of the prior art products described above suffer from the disadvantage of being too stiff for use as a facial tissue. Nevertheless, there is a need for a facial tissue which has the barrier properties of a plastic film and yet is still soft and pliable. Such a tissue may be particularly useful in preventing the spread of colds or flu by reducing contact between the user's hands and nasal discharge. In addition, there is also a need for producing a softer paper towel having the aforementioned barrier properties while remaining absorbent.

SUMMARY OF THE INVENTION

In general, the invention resides in a multi-layered tissue product comprising first and second adjacent layers of creped cellulosic wadding and an inner layer of plastic film wherein said plastic film is substantially incompletely bonded to at least one of said adjacent layers and sufficiently bonded to both of said adjacent layers to maintain the integrity of the product. Applicants have discovered that a soft and pliable tissue product can be made if the inner layer of plastic film is not substantially overall bonded to both of the adjacent layers. Instead, overall bonding to only one of the adjacent layers produces a softer and more pliable product such that it can be used as a facial tissue. A product with substantially incomplete bonding of the film to both adjacent layers is also within the scope of this invention, but could require conveying the film between the adjacent layers and bonding the three layers together at select points. Because of the thinness of the films necessary to achieve adequate softness and pliability, such films might easily break in a commercial operation. In order to minimize the distance such film must be conveyed and to avoid breakage, the film can be formed by extrusion in close proximity to the adjacent layer. Nevertheless, by extruding the film onto the first adjacent layer to obtain overall bonding to the first adjacent layer and thereafter substantially incompletely bonding the second adjacent layer to the film at selected points or areas to maintain the integrity of the product, a very supple absorbent product can be obtained with the desired barrier properties. Although this invention includes multi-layered products having three or more layers, for simplicity the invention will hereinafter be primarily described in terms of a three-layered product wherein the first and second adjacent layers are also the first and second outer layers of the product. For purposes herein, "tissue" shall include paper towel products as well as facial and bathroom tissue products.

The term "substantially incompletely bonded" as used herein means that at least 90% of the surface area of a web or layer is not bonded to an adjacent layer.

The strength of the bonding between the film and the first outer layer is not critical, except that the bonding in those areas of the sheet intended to maintain the integrity of the multi-layered product must be sufficiently strong to accomplish that purpose. The bonding strength between the plastic film and the first outer layer can be light, i.e the film can be easily peeled from the first outer layer without rupturing the outer layer. Stronger bonding is also suitable, however.

The thickness of the film should not exceed about 0.0005 inch because thicker films will most likely be too stiff to obtain the desired softness and pliability preferred by consumers. Thicknesses of about 0.00025 inch or less are preferable, and about 0.0001 inch or less are most preferred. The lower limit on the thickness of the film is determined only by the ability of the film to be formed without developing holes such that water can pass through. Naturally the thicker films are preferably more suitable for paper towels than for facial tissues.

Any plastic film can be used as long at it is sufficiently flexible to achieve the desired stiffness level in the final product. Thermoplastics are preferred because of their ability to be extruded onto the first outer layer and thereafter attached to the second outer layer. However this is a process consideration and not a limitation on the product itself. Polyethylene is most preferred because it is inexpensive, readily available, and its properties are well understood by those in the plastics extrusion arts.

The first and second outer layers can be any cellulosic absorbent web suitable for making tissue products and are well known in the papermaking industry. Creped webs having a basic weight of from about 8 to about 15 lbs. per 2880 ft.$^2$ are preferred for each outer layer for facial and bathroom tissue products, but heavier basis weights can be used, particularly for paper towels. In addition, absorbent webs containing amounts of other fibers besides or in addition to cellulosic fibers can also be used, such as coformed webs containing a combination of polypropylene and cellulosic fibers.

DETAILED DESCRIPTION OF THE DRAWING

Figure 1:
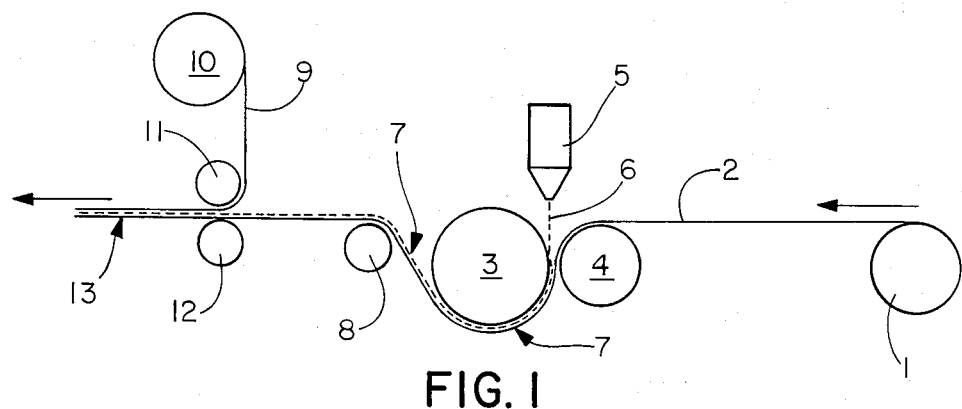
FIG. 1 is a schematic flow diagram of a process for making a multi-layered tissue product of this invention wherein the inner plastic film layer is overall bonded to the first outer layer and substantially incompletely bonded to the second outer layer.

Directing attention to FIG. 1, one aspect of this invention will be described in greater detail. Shown is a first feed roll 1 which supplied the first outer layer 2 (which can be a multi-layered web) to which the plastic film is overall bonded. The first outer layer 2 is pressed against a rotating chill roll 3 by pressure roll 4. The die of extruder 5 deposits a thermoplastic extrudate or coating 6 onto the first outer layer as it enters the nip between the chill roll 3 and the pressure roll 4. The extrudate (film) is overall bonded to the first outer layer as the resulting composite intermediate web 7 is cooled by the chill roll. The resulting intermediate web 7 leaves the chill roll and passes over roll 8. The second outer layer 9 (which can also be a multi-layered web) is supplied by a second feed roll 10 and is brought into contacting relationship with the composite intermediate web 7 such that the plastic inner layer (film) is sandwiched between the first and second outer layers. All three layers pass through the nip formed by rolls 11 and 12 wherein the second outer layer is bonded to the film sufficiently to maintain the integrity of the multi-layered product 13. For example, the edges of the multi-layered product can be crimped or spot embossed as desired to preserve the integrity of the product. Alternatively, the entire product can be embossed overall with a very widely spaced pattern so that the second outer layer remains substantially unbonded, based on the surface area of the second outer layer.

In this embodiment the extruded plastic film is substantially overall bonded to the first outer layer and substantially incompletely bonded to the second outer layer. The strength of the overall bonding to the first outer layer is controlled by several factors such as the melt temperature, chill roll temperature, extruder die temperature, the line speed, extrusion rate, the air gap between the extruder orifice and the chill roll, the distance the extrudate travels on the chill roll before entering the nip, and the nip pressure at pressure roll 4. Those skilled in the art of extrusion will be able to optimize the process to achieve the desired film thickness and adhesion to both outer layers.

Figure 2:
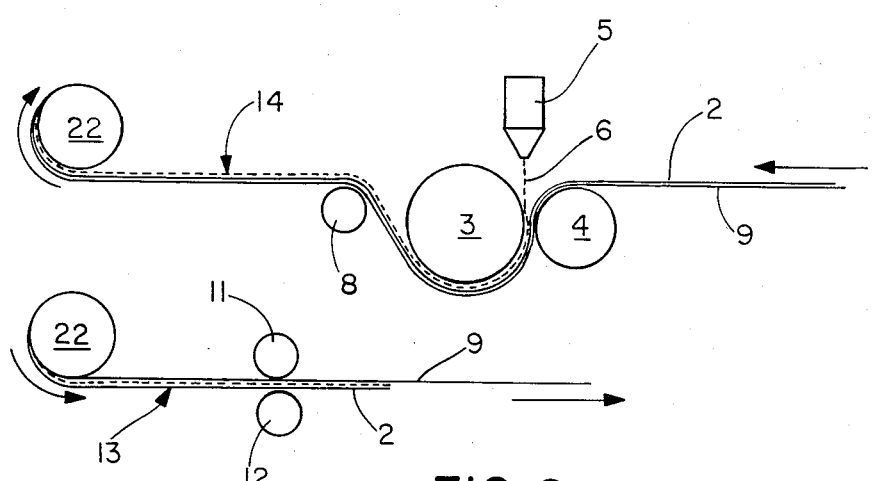
FIG. 2 is a schematic flow diagram of a modified process of this invention for producing the same product of the process of FIG. 1 wherein the first and second outer layers are fed to the chill roll in a superposed relation.

FIG. 2 represents a process of this invention for making the same product as the process of FIG. 1, except the inner plastic layer or coating is deposited on the surface of the first of two unattached, superposed, creped plies. The advantage of this process is that the thin creped tissue layers used for making the multi-layered products of this invention may be susceptible to breakage during high speed production. Therefore using a superposed two-ply substrate for extrusion aids in eliminating breakage by providing additional strength due to the presence of the second ply. In order to end up with the plastic layer in between the two substrate layers, however, it is necessary to wind and unwind the intermediate product in a proper manner. By reference to FIG. 2, the process will become more clear.

To produce a three-ply final product, first and second superposed unattached tissue plies 2 and 9 respectively are fed to the nip between the chill roll 3 and the pressure roll 4. The first (upper) of the two plies receives the extrudate 6 from the extruder 5 as they are pressed together in the nip as in the process of FIG. 1. As the composite remains in contact with the chill roll, the extrudate hardens into a plastic film and is substantially bonded overall to the fibers of the first of the two plies. The resulting intermediate composite 14 can be is wound up as shown onto roll 22 for converting. (It is not essential that the intermediate composite be wound as shown with the film side inward toward the center of the roll. It can be wound up the opposite way as well, but for purposes of illustration, the film side is shown toward the center of the roll.) As the intermediate composite 14 is wound up, the film layer becomes sandwiched between the first ply (or layer) upon which the film was deposited and the unattached second ply already wound up on the roll.

To convert the intermediate composite from roll 22 into a final three-layered product having the plastic layer in the center, roll 22 must be unwound by first unwinding only the outer tissue layer 9 for one revolution of the roll. Thereafter, the two tissue layers are unwound together and the plastic layer will be sandwiched in between. The three layers must be sufficiently bonded together to maintain the integrity of the final product 13, which is preferably achieved as previously discussed by passing them through the nip formed by rolls 11 and 12 wherein the edges can be calendered, crimped, or embossed sufficiently to hold the product together in a layered relationship, i.e., to keep it from falling apart. In some cases the static electrical attraction between the layers may be sufficient to hold the product together without the nip, but some sort of physical bonding step is preferred.

Figure 3:
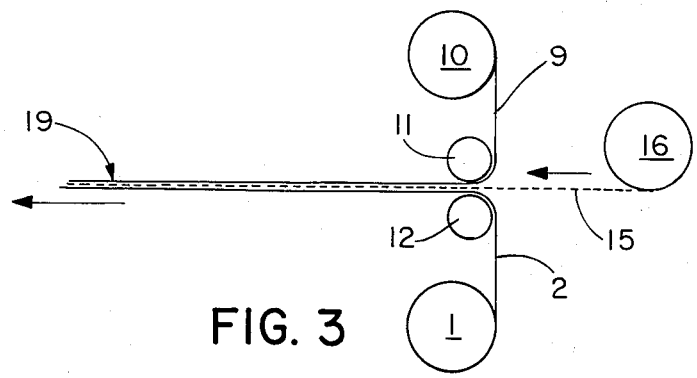
FIG. 3 is a schematic flow diagram of another process for making another product of this invention wherein the inner film layer is substantially incompletely bonded to both the first and second outer layers.

FIG. 3 illustrates a process for making a product according to this invention which has no overall bonding of the plastic film inner layer to either of the two outer layers. More specifically, a first outer layer 2, a second outer layer 9, and an inner plastic film layer 15 are supplied by feed rolls 1, 10, and 16, respectively and brought into contacting relationship at the nip formed by rolls 11 and 12. The contacted layers are crimped or embossed to maintain the integrity of the product 19, but in such a manner to leave the surfaces of the inner film layer substantially unbonded to the outer layers. In other words, most of the surface area of each layer is unbonded.

EXAMPLES

The process as described in FIG. 2 was used to prepare several tissue samples to illustrate the effect of overall bonding of the inner layer to only one outer layer and the effect of product properties by changing the thickness of the inner film. In each case the first and second outer layers were typical creped wadding having a basis weight of about 9 lbs. per 2880 ft.$^2$ and a furnish of 60% northern softwood kraft and 40% hardwood kraft. The extruder was a 3.5 inch diameter, 30 L/D extruder and the resin used was a low density (0.918) polyethylene[1] having a melt index of 13. The results are set forth in TABLES I and II.

TABLE I

Process Data

| Sample | Mode | Chill Roll Temp. (°F.) | Air Gap (inches) | Extruder RPM | Coating Speed (ft./min.) | Film Thickness (inches) |
|---|---|---|---|---|---|---|
| 1 | Coating | 50 | 10 | 15 | 324 | .00025 |
| 2 | Coating | 50 | 10 | 10 | 600 | .00010 |
| 3 | Coating | 100 | 1.5 | 15 | 324 | .00025 |
| 4 | Coating | 100 | 1.5 | 10 | 600 | .00010 |
| 5 | Laminating | 100 | 1.5 | 15 | 324 | .00025 |
| 6 | Laminating | 100 | 1.5 | 10 | 600 | .00010 |

[1]PF-1013 sold by Chemplex Corp. of Rolling Meadows, Illinois

TABLE II

Product Data

| Sample | Product Type | Film Thickness (inches) | Peel Strength[2] (grams 2 inches) | Stiffness[3] | Softness |
|---|---|---|---|---|---|
| 1 | This invention | .00025 | 29.5 | 5.6 | 3.1 |
| 2 | This invention | .00010 | 6.7 | 4.0 | 7.0 |
| 3 | This invention | .00025 | 36.1 | 4.6 | 4.6 |
| 4 | This invention | .00010 | 3.4 | 3.8 | 7.0 |
| 5 | Prior art design | .00025 | (4) | 16.7 | −0.5 |
| 6 | Prior art design | .00010 | 18.3 | 9.9 | 1.4 |

[2]Peel strength measured by Instron using a 2 inch wide sample attached to a 2 inch wide strip of tape (#355). The tape was partially peeled away from the sample and each was clamped with jaws of the Instron. Peak load reading for peeling away the tape was recorded
[3]Stiffness measured by Handle-O-Meter
[4]Could not be peeled (tissue tore)

As can be seen from a comparison of Samples 1 vs. 2 and 3 vs. 4, the thicker films had a tendency to adhere more strongly to the outer layer as evidenced by the peel strength values in each case. Samples 1 and 2 were run on the extruder under conditions designed to achieve relatively low adhesion by using a large air gap between the extruder and the chill roll and by keeping the chill roll at a lower temperature (50° F.). Samples 3 and 4 were run under conditions designed to achieve relatively high adhesion by reducing the air gap and increasing the chill roll temperature. In each case the thinner film (0.00010 inch) had less adhesion, lower stiffness, and higher softness. Softness was subjectively measured by a trained sensory panel by feeling the tissues and rating them on a scale of 1 to 15. In each case the thinner and less strongly adhered sample has a higher softness rating. The difference in softness is not believed to be solely the result of the thickness difference, but is in part attributable to the difference in the degree of adhesion occurring in the formation of the thinner film. For this reason (and for economy) thinner films are preferred, most preferably having a thickness of 0.00025 or less because a softness of about 3 is a satisfactory product for certain market segments. A softness of about 7 is greatly preferred, however.

Comparing Samples 3 and 4 vs. 5 and 6 illustrates the marked improvement of the product of this invention compared to an equivalent product of the design used by the prior art but having the benefit of the thinner films. Samples 5 and 6 are prepared by adhering the film to both outer layers. As can be seen from the stiffness and softness data, Samples 3 and 4 are substantially softer and less stiff due to the fact of having the inner plastic film overall bonded to only one of the two outer layers, as opposed to a similar product having the inner layer bonded to both outer layers.

It will be appreciated that the foregoing examples are shown for the purposes of illustration only and are not to be construed as limiting the scope of this invention, which is defined by the following claims.

What is claimed is:

1. A multi-layered tissue comprising:
   (a) a first layer of creped cellulose wadding;
   (b) a second layer of creped cellulose wadding; and
   (c) a layer of plastic film disposed between said first and second layers;

wherein said film is unbonded to said first layer, except where the film and first layer are bonded together along their common edges sufficiently to maintain the integrity of the tissue, and wherein said film is unbonded or lightly and uniformly bonded to said second layer, except where the film and the second layer are bonded together along their common edges sufficiently to maintain the integrity of the tissue, such that in all areas of the tissue other than said bonded edges the film can be peeled away from the first and second layer without rupturing either layer.

2. The multi-layered tissue of claim 1 wherein the film is unbonded to both the first and second layers, except where the film and the first and second layers are bonded together along their common edges.

3. The multi-layered tissue of claim 1 wherein the film is lightly and uniformly bonded to the second layer, except where the film and the second layer are bonded together along their common edges.

4. The tissue of claim 3 wherein said first and second layers are outer layers.

5. The tissue of claim 4 wherein the plastic film is thermoplastic.

6. The tissue of claim 5 wherein the plastic film is polyethylene.

7. The tissue of claim 6 wherein the thickness of the polyethylene film is less than about 0.0005 inch.

8. The tissue of claim 7 wherein the thickness of the plastic film is about 0.00025 inch or less.

9. The tissue of claim 7 wherein the thickness of the plastic film is about 0.0001 inch or less.

10. The tissue of claim 7 wherein the basis weight of the first and second outer layers is from about 8 to about 15 pounds per 2880 square feet.

11. The tissue of claim 10 wherein the integrity of the multi-layered tissue is maintained by crimping the tissue along or near at least one edge of the tissue.

12. A three-layered tissue comprising:
   (a) a first layer of creped cellulose wadding having a basis weight of about 8–15 pounds per 2880 square feet;
   (b) a second layer of creped cellulose wadding having a basis weight of about 8–15 pounds per square foot; and
   (c) a layer of polyethylene film having a thickness of about 0.00025 inch or less disposed between said first and second layers;

wherein said film is unbonded to said first layer, except where the film and first layer are crimped together along their common edges sufficiently to maintain the integrity of the tissue, and wherein said film is lightly and uniformly bonded to said second layer, except where the film and the second layer are crimped together along their common edges to sufficiently maintain the integrity of the tissue, such that in the uncrimped areas the film can be peeled away from the second layer without rupturing said second layer.

* * * * *